United States Patent

[11] 3,572,941

| [72] | Inventor | Zoltan Kiss |
| | | Belle Mead, N.J. |
| [21] | Appl. No. | 688,779 |
| [22] | Filed | Dec. 7, 1967 |
| [45] | Patented | Mar. 30, 1971 |
| [73] | Assignee | RCA Corporation |

[54] PHOTOCHROMIC DEVICE BASED UPON PHOTON ABSORPTION
10 Claims, 3 Drawing Figs.

[52] U.S. Cl.................................................. 350/150,
350/160
[51] Int. Cl.................................................. G02b 1/26,
G02b 1/36
[50] Field of Search........................................ 350/160(P),
150, (OSR Digest)

[56] References Cited
UNITED STATES PATENTS
3,417,381  12/1968  Sincerbox......................(350/160P)UX 3,453,604  7/1969  Geusic et al. .................. 313/92X
3,495,893  2/1970  Geusic et al. .................. 350/160

OTHER REFERENCES

Exelby et al. " Phototropy (or Photochromism)" Chemical Reviews Vol. 65, 1965, pp. 247— 260. 350— 160 (P).

*Primary Examiner*—John K. Corbin
*Attorney*—Glenn H. Bruestle

ABSTRACT: A device capable of displaying and storing three dimensional images comprises a photochromic target and a light source. The light source emits light of a power density and a frequency so as to be substantially transmitted by the photochromic target. The power density and frequency of the emitted light is such that when light is focused at a spot to provide an increased power density at this spot, double photon absorption of the light by the photochromic target occurs and causes a change in the optical density characteristics of the photochromic target in the region of absorption. The device therefor includes means for focusing the light.

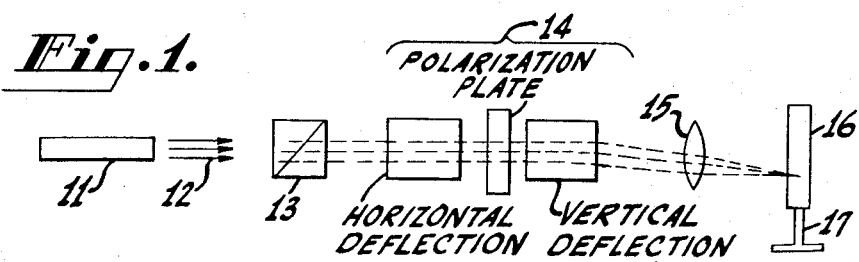
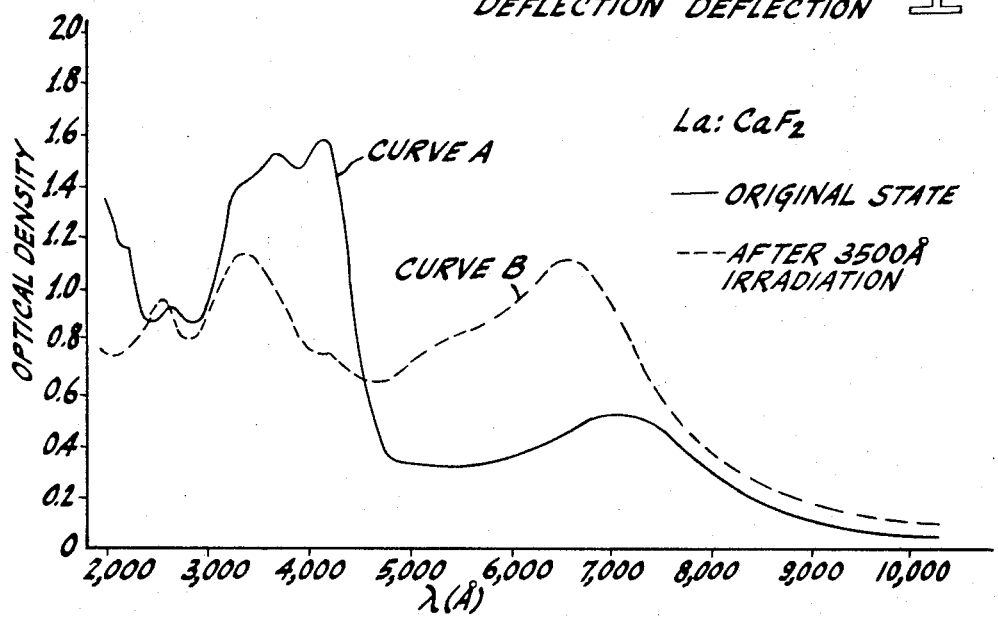
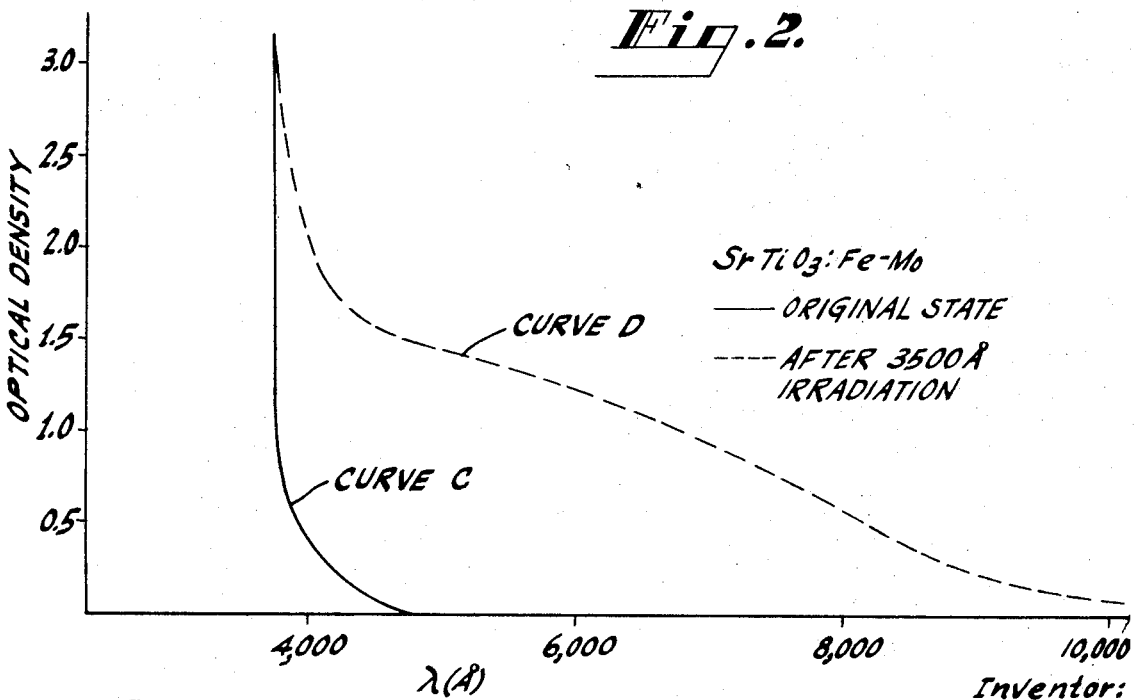
Inventor:
ZOLTAN KISS
By
Attorney

PHOTOCHROMIC DEVICE BASED UPON PHOTON ABSORPTION

BACKGROUND OF THE INVENTION

This invention relates to display and information storage devices wherein an image is formed on a photochromic target. Prior art display devices utilizing photochromic materials produce a two dimensional image. It is often desirable for applications such as radar screens, television systems, computer memories and other display or storage devices to produce an image in three dimensions.

SUMMARY OF THE INVENTION

An information storage and display device comprises a photochromic target upon which an image can be formed, a high intensity light source for forming the image on the target and means for focusing the light from the light source on selected regions of the target. The power density and the frequency of the light is such that, when unfocused, it is substantially transmitted through the photochromic target, and when focused, a portion of the light is absorbed at the focal point due to double photon impingement. This absorption causes the photochromic target to change its optical density characteristics in the region of the focal point thereby recording information at this region.

BRIEF DESCRIPTION OF THE DRAWINGS

FIG. 1 is a schematic side elevational view of a device for creating an image on a photochromic target in accordance with the invention.

FIG. 2 is a graph showing the absorption spectrum of a cerium doped calcium fluoride photochromic crystal.

FIG. 3 is a graph showing the absorption spectrum of an iron and molybdenum doped strontium titanate photochromic crystal.

DESCRIPTION OF THE PREFERRED EMBODIMENTS

Example 1

Referring to FIG. 1, there is depicted an information storage and/or display device according to the invention. In this embodiment a one watt argon laser 11 provides the monochromatic high intensity light beam 12 necessary for operation of the device. The laser is adjusted so as to emit light having a wavelength of 5,145A. The light beam 12 then passes through a light amplitude modulator 13 and a light deflector 14. The amplitude modulator 13, which is optional, can be for example an electro-optic potassium dehydrogen phosphate (KDP) crystal in the form of a Wollaston prism. The light deflector 14, which is also optional, can be of the electro-optic digital deflection type as is well known in the art. The light deflector used herein is capable of deflecting the light in both the vertical and horizontal directions so as to produce a two dimensional raster. The light beam 12 is passed through a focusing lens 15 and made to focus upon a photochromic target 16. The particular focusing lens 15 of this example is a 1 inch diameter F/2 lens. The particular photochromic target 16 is a 1 inch diameter, ½ inch thick lanthanum doped calcium fluoride crystal.

The target 16 is mounted on a support 17 which is moveable linearly along the direction of the light beam 12. The depth of the focal point within the target 16 is thus determined by the position of the target 16. In this way a three dimensional image can be formed in the target 16.

The light at the focal point consists of a sphere of about 10 microns in diameter having a cross-sectional power density of about 40 megawatts/cm$^2$. At this power density the photochromic target 16 absorbs light due to a double photon absorption. This is, two photons are absorbed simultaneously so as to be equivalent in energy to light of twice the frequency emitted by the laser. The target 16 is characterized in that it transmits light of the frequency emitted by the laser but absorbs light of an energy equal to twice that frequency and upon absorbing such light it changes its optical density characteristics.

In the particular system described above, the optical density of the target 16 is caused to increase from an optical density of almost 0 to an optical density of 1 for light of the frequency emitted by the laser in a time of 10$^{-17}$ seconds. This is equivalent to a change from almost 100 percent transmission to only 10 percent transmission in only 1 microsecond. The change in optical density of the target 16 is proportional to the number of two photon processes that occur and this is dependent upon the square of the power density of the light beam at any given point on the target. Theoretically, there is a finite amount of double photon absorption even at very low power densities. However, the minimum power density necessary to obtain a degree of double photon absorption sufficient to create an observable change in optical density is in the order of 20 megawatts/cm$^2$. Since the power density drops off rapidly as one moves away from the focal point, the intensity of the laser can be adjusted so that there will be so few double photon absorption processes outside the focal region that there will be no observable change in optical density outside this region. In this way, one can create a high resolution image in the photochromic target 16.

For the production of images or patterns in three dimensions, the photochromic target 16 should be relatively thick. The preferred thickness will vary depending upon the application of the device. For example, the larger the depth of field of the image that one wants to store on the photochromic target, the larger the target thickness required. Alternatively, one may want to store a series of essentially two dimensional patterns in different cross-sectional planes of the photochromic target to take advantage of the high information storage density of this technique so as to replace present microfilm storage. Here the thickness will vary with the desired storage density and readout capabilities.

Many variations of the above embodiment are possible. For example, any light source having a high enough intensity of light at a frequency or frequency band which is transmitted by the photochromic target when unfocused but is partially absorbed by the photochromic target when focused thereon causing said photochromic to change its optical density characteristics is useful in the practice of this invention. Lasers are the preferable means for creating the light beam. They may be continuous wave or pulsed.

Any photochromic material that can withstand the power densities necessary for double photon absorption and exhibit the transmission and absorption properties as previously described are useful in the practice of this invention. Because of the relatively high power densities required, it is generally preferable to utilize inorganic type photochromics as these can generally withstand higher temperatures without decomposition than organic photochromics. However organic photochromics may also be employed. Of course, the photochromic chosen must be operable with the particular light source used in the device, or vice versa.

Examples of several useful photochromics and light sources operable therewith are: a crystalline calcium fluoride doped with rare earth ions such as crystalline calcium fluoride doped with lanthanum (CaF2:La), or crystalline strontium titanate doped with iron and molybdenum (SrTiO$_3$:Fe—Mo) operable with ruby, argon, krypton or xenon lasers; and SrTiO$_3$:Fe—Mo operable with a neodymium doped yttrium aluminum garnet laser.

Light amplitude modulation is only necessary if one wants a variation in optical density at different points in the image, that is, if one desires a grey scale. This can be accomplished by many means. For example, the light beam can be amplitude modulated by varying the power output of the light or by placing a partially transmitting and partially reflecting or absorbing material in the light path.

Light deflection can be accomplished by many means including: mechanical deflection, electromechanical deflection, electroacoustic, and electro-optical means. Many such systems are described or made reference to in an article by R. A. Soref et al. appearing in the Nov. 29, 1965 issue of Electronics. Alternatively, the light beam need not be deflected at all, and the point of focus on the target can be changed by either a movement of the light source or a movement of the photochromic target. It is preferable to use electro-optical amplitude and deflection modulation means due to the high speeds of response and the ease of coupling to input signals from an outside source such as a computer or a video signal.

Example 2

This example is identical to that of Example 1 except that the light source is a Q-switched ruby laser having a front emitting surface area of ½cm². The laser has a one joule pulse lasting 20 nanoseconds, and a pulse repetition rate of 1 pulse per second is employed. The image is stored on a $SrTiO_3$:Fe-Mo photochromic target.

The images produced in a photochromic target may be stored therein for a length of time dependent upon the decay time of the photochromic. This may be for a period of fractions of a second to an indefinitely long period. The image can be displayed or readout by passing light through the photochromic at a frequency or frequency band at which the change in optical density takes place due to the double photon absorption. Generally this includes the frequency of the light source used for producing the image. Many photochromics in addition to the read frequency possess an erase frequency or frequency band. That is a frequency band which causes the previously darkened areas to be bleached.

FIGS. 2 and 3 are graphical representations of the room temperature absorption characteristics of $SrTiO_3$:Fe-Mo and CaF2:La respectively.

The CaF2:La curves of FIG. 2 were obtained using a chemically reduced $CaF_2$ crystal which contained about 0.1 mol percent lanthanum. The natural absorption spectra of this material is shown in curve A of FIG. 2. When light in the near uv absorption band, for example light of 3,600 A strikes the material, the CaF2:La absorption spectra changes to that of Curve B. According to this curve the near uv absorption band is bleached and the visible absorption band is increased. Light in the visible band does not change the absorption spectra of Curve A. A laser emitting light at about 7,000 A would only affect the absorption spectra in a region of high power density where a two photon absorption process occurs since this is equivalent to light at 3,500A. The information can then be read out utilizing light in the visible region.

The $SrTiO_3$:Fe-Mo curves of FIG. 3 were obtained using crystals containing about 0.1 mol percent Mo and 0.01 mole percent Fe. The natural absorption spectra of this material is shown in Curve C and the absorption spectra obtained after irradiation with 3,500A light is shown in Curve D of FIG. 3. This contrast ratio in this material is much better than that of the La:$CaF_2$ since there is essentially no absorption in the visible region until a change in absorption takes place at an energy equivalent to light of less than about 4,000A.

I claim:

1. An image storage and display device comprising:
   a. a three-dimensional photochromic target of a given photon absorption optical density change characteristic;
   b. a source of light, double photon bombardment of said target by which, produces a change in optical density in said target, said light having a power density at said target such that when unfocused, relatively no double photon absorption occurs; and
   c. means for focusing said light in said target to increase the double photon absorption and thus produce a measurable optical density change therein.

2. The device described in claim 1 including means for modulating the focal point of said light in said target.

3. The device described in claim 2 wherein said modulating means is at least partially electrooptical in nature and is capable of varying the focal point in three dimensions so as to create a three dimensional image on said target.

4. The device described in claim 2 including amplitude modulating means.

5. The device claimed in claim 1 wherein said light source is a laser.

6. The device described in claim 1 wherein said photochromic target is comprised of calcium fluoride doped with rare earth ions in a reduced state or strontium titanate doped with ions of molybdenum and iron.

7. The device described in claim 6 wherein the photochromic target is a single crystal of either $CaF_2$ doped with La or $SrTiO_3$ doped with Fe and Mo.

8. The device described in claim 7 wherein the light source is a laser of the type chosen from ruby, argon, krypton, and zenon lasers.

9. The device described in claim 8 including means for electrooptically modulating the amplitude and means for electrooptically modulating the position of the light impinging on said target each of said modulating means being coupled to a signal source so as to create a predetermined image on said target.

10. An image storage and display device comprising:
   a. a three-dimensional photochromic target adapted to have an image formed therein, said target characterized in that its optical density characteristics alter when energy in a certain absorption band is caused to be absorbed by said target due to double photon absorption;
   b. a source for emitting high intensity light of a power density and frequency such that when focused on said target a portion of said light is absorbed by said target due to double photon absorption in the region of the focal point causing said target to change its optical density characteristics in said region, and when unfocused said light is substantially transmitted by said target; and
   c. means for focusing said light on selected regions of said target for forming an image therein.